(12) United States Patent
Chan

(10) Patent No.: US 11,451,143 B2
(45) Date of Patent: Sep. 20, 2022

(54) BOOST CONVERTER FOR IMPROVING OUTPUT STABILITY

(71) Applicant: Acer Incorporated, New Taipei (TW)

(72) Inventor: Tzu-Tseng Chan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 37 days.

(21) Appl. No.: 17/191,922

(22) Filed: Mar. 4, 2021

(65) Prior Publication Data

US 2022/0006379 A1 Jan. 6, 2022

(30) Foreign Application Priority Data

Jul. 1, 2020 (TW) ................................. 109122209

(51) Int. Cl.
| | |
|---|---|
| *H02M 3/156* | (2006.01) |
| *H02M 1/08* | (2006.01) |
| *H02M 1/00* | (2006.01) |
| *H02M 3/155* | (2006.01) |
| *H02M 1/42* | (2007.01) |

(52) U.S. Cl.
CPC ......... *H02M 3/156* (2013.01); *H02M 1/0025* (2021.05); *H02M 1/08* (2013.01); *H02M 1/0038* (2021.05); *H02M 1/4225* (2013.01); *H02M 3/1552* (2021.05)

(58) Field of Classification Search
CPC .. H02M 3/156; H02M 1/0025; H02M 1/4225; H02M 3/1552
See application file for complete search history.

(56) References Cited

U.S. PATENT DOCUMENTS

| | | | | |
|---|---|---|---|---|
| 2014/0300274 | A1* | 10/2014 | Acatrinei | H05B 45/50 |
| | | | | 315/122 |
| 2015/0062108 | A1* | 3/2015 | Archibald | G06F 1/26 |
| | | | | 345/212 |
| 2019/0081553 | A1* | 3/2019 | Sugimoto | H02M 7/217 |
| 2020/0228010 | A1* | 7/2020 | Wiktor | H02M 3/156 |

\* cited by examiner

*Primary Examiner* — Alex Torres-Rivera
(74) *Attorney, Agent, or Firm* — McClure, Qualey & Rodack, LLP

(57) ABSTRACT

A boost converter for improving output stability includes a transformer, a detection circuit, a first resistor, a power switch element, an output stage circuit, a feedback compensation circuit, a controller, an inverter, and a multiplier. The transformer includes a main coil and a secondary coil. The main coil receives an input voltage. The detection circuit is coupled to the secondary coil. The detection circuit generates a detection voltage. The first resistor is coupled to the main coil. The output stage circuit generates an output voltage. The feedback compensation circuit generates a feedback voltage according to the output voltage. The inverter generates an inverted oscillation voltage. The multiplier generates a compensation voltage difference according to the detection voltage, the inverted oscillation voltage, and the feedback voltage. The compensation voltage difference is applied to the first resistor.

15 Claims, 5 Drawing Sheets

BOOST CONVERTER FOR IMPROVING OUTPUT STABILITY

CROSS REFERENCE TO RELATED APPLICATIONS

This Application claims priority of Taiwan Patent Application No. 109122209 filed on Jul. 1, 2020, the entirety of which is incorporated by reference herein.

BACKGROUND OF THE INVENTION

Field of the Invention

The disclosure generally relates to a boost converter, and more specifically, to a boost converter for improving the output stability.

Description of the Related Art

A conventional boost converter is usually controlled by a current mode. However, when a duty cycle of a power switch element is greater than 50%, the boost converter tends to generate subharmonic oscillations and reduce the whole output stability. Accordingly, there is a need to propose a novel solution for solving the problems of the prior art.

BRIEF SUMMARY OF THE INVENTION

In a preferred embodiment, the invention is directed to a boost converter for improving the output stability. The boost converter includes a transformer, a detection circuit, a first resistor, a power switch element, an output stage circuit, a feedback compensation circuit, a controller, an inverter, and a multiplier. The transformer includes a main coil and a secondary coil. The main coil receives an input voltage. The detection circuit is coupled to the secondary coil. The detection circuit generates a detection voltage. The first resistor is coupled to the main coil. The power switch element selectively couples the first resistor to a ground voltage according to a clock voltage. The output stage circuit is coupled to the first resistor. The output stage circuit generates an output voltage. The feedback compensation circuit includes a linear optical coupler and a voltage regulator. The feedback compensation circuit generates a feedback voltage according to the output voltage. The controller generates the clock voltage according to the feedback voltage and an oscillator voltage. The inverter generates an inverted oscillation voltage according to the oscillator voltage. The multiplier generates a compensation voltage difference according to the detection voltage, the inverted oscillation voltage, and the feedback voltage. The compensation voltage difference is applied to the first resistor.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
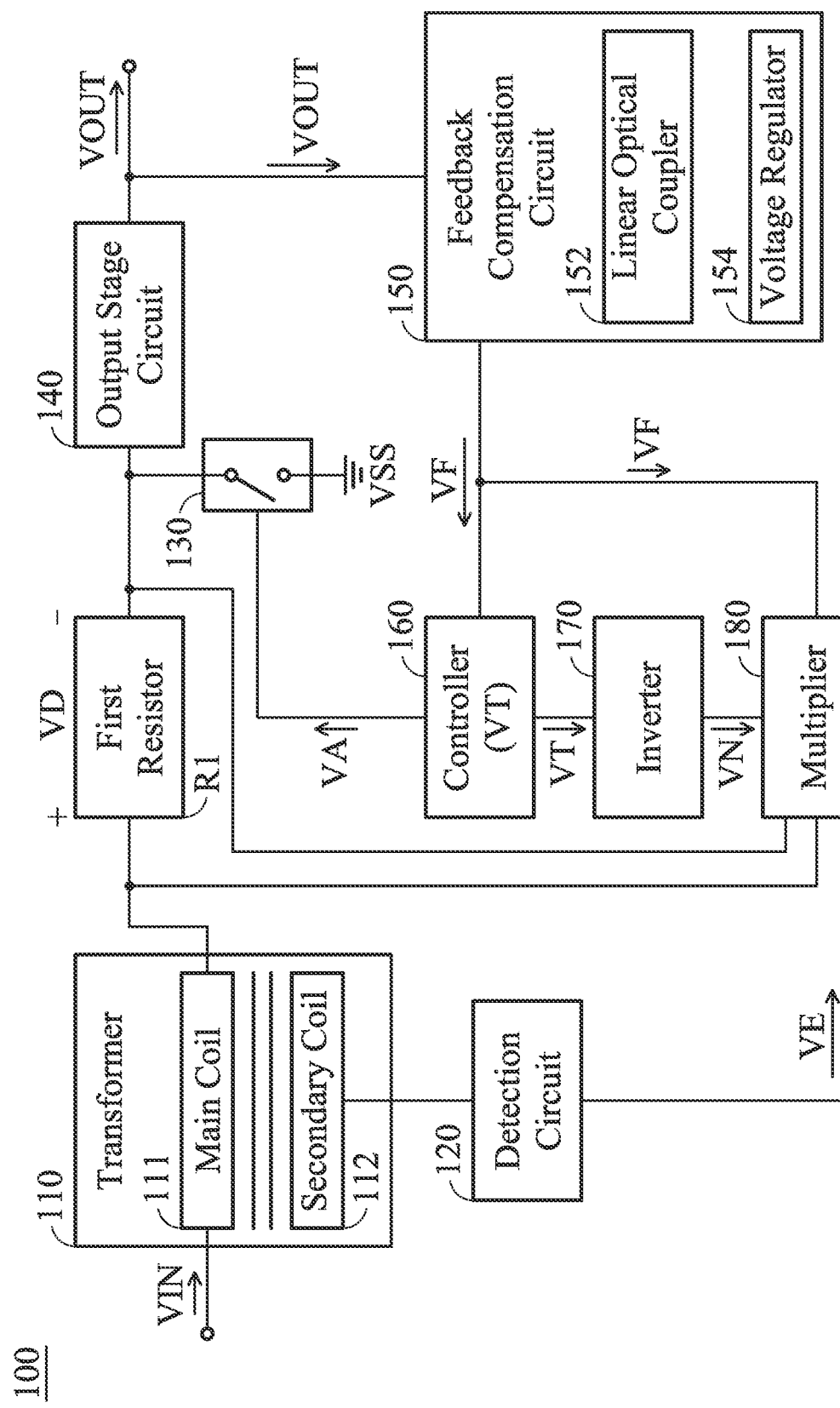
FIG. 1 is a diagram of a boost converter according to an embodiment of the invention.

FIG. 1 is a diagram of a boost converter 100 according to an embodiment of the invention. The boost converter 100 may be applied to a desktop computer, a notebook computer, or an all-in-one computer. As shown in FIG. 1, the boost converter 100 includes a transformer 110, a detection circuit 120, a first resistor R1, a power switch element 130, an output stage circuit 140, a feedback compensation circuit 150, a controller 160, an inverter 170, and a multiplier 180. It should be noted that the boost converter 100 may further include other components, such as a voltage regulator and/or a negative feedback circuit, although they are not displayed in FIG. 1.

The transformer 110 includes a main coil 111 and a secondary coil 112. The main coil 111 is positioned on one side of the transformer 110, and the secondary coil 112 is positioned on the opposite side of the transformer 110. The main coil 111 receives an input voltage VIN. The input voltage VIN may be from an external power source. The input voltage VIN may be an AC (Alternating Current) voltage with any frequency and any magnitude. For example, the frequency of the input voltage VIN may be about 50 Hz or 60 Hz, and the RMS (Root-Mean-Square) value of the input voltage VIN may be from 90V to 264V, but they are not limited thereto. The detection circuit 120 is coupled to the secondary coil 112. The detection circuit 120 generates a detection voltage VE, which is relative to the input voltage VIN. The first resistor R1 is coupled to the main coil 111. The power switch element 130 selectively couples the first resistor R1 to a ground voltage VSS (e.g., 0V) according to a clock voltage VA. For example, if the clock voltage VA has a high logic level, the power switch element 130 may couple the first resistor R1 to the ground voltage VSS (i.e., the power switch element 130 may almost be a short-circuited path). Conversely, if the clock voltage VA has a low logic level, the power switch element 130 may not couple the first resistor R1 to the ground voltage VSS (i.e., the power switch element 130 may almost be an open-circuited path). The output stage circuit 140 is coupled to the first resistor R1. The output stage circuit 140 generates an output voltage VOUT. For example, the output voltage VOUT may be a DC (Direct Current) voltage, whose voltage level may be about 400V, but it is not limited thereto. The feedback compensation circuit 150 includes a linear optical coupler 152 and a voltage regulator 154. The feedback compensation circuit 150 generates a feedback voltage VF according to the output voltage VOUT. For example, the controller 160 may be a PWM (Pulse Width Modulation) IC (Integrated Circuit), and it can automatically generate an oscillation voltage VT. The controller 160 further generates the clock voltage VA according to the feedback voltage VF and the oscillation voltage VT. The inverter 170 generates an inverted oscillation voltage VN according to the oscillation voltage VT. The multiplier 180 generates a compensation voltage difference VD according to the detection voltage VE, the inverted oscillation voltage VN, and the feedback voltage VF. The compensation voltage difference VD is applied to the first resistor R1. With such a design, even if the duty cycle of the power switch element 130 is greater than 50%, the multiplier 180 can still provide a compensation voltage difference VD having a negative slope, so as to effectively suppress the unwanted subharmonic oscillations in the boost converter 100. Therefore, the output stability of the boost converter 100 can be significantly enhanced.

The following embodiments will introduce the detailed structure and operation of the boost converter 100. It should be understood these figures and descriptions are merely exemplary, rather than limitations of the invention.

Figure 2:
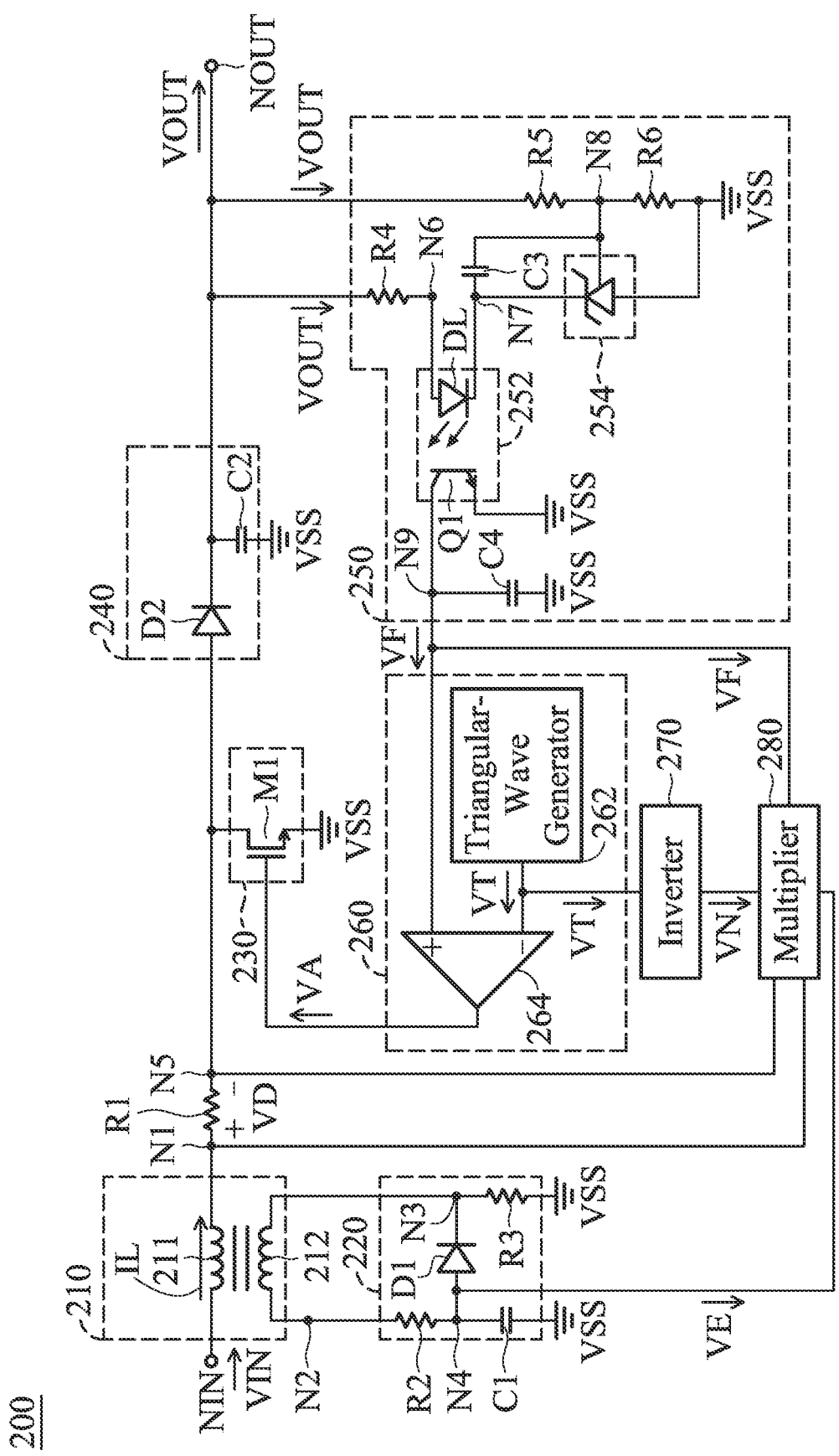
FIG. 2 is a diagram of a boost converter according to an embodiment of the invention.

FIG. 2 is a diagram of a boost converter 200 according to an embodiment of the invention. In the embodiment of FIG. 2, the boost converter 200 with an input node NIN and an output node NOUT includes a transformer 210, a detection circuit 220, a first resistor R1, a power switch element 230, an output stage circuit 240, a feedback compensation circuit 250, a controller 260, an inverter 270, and a multiplier 280. The input node NIN of the boost converter 200 is arranged for receiving an input voltage VIN. The output node NOUT of the boost converter 200 is arranged for outputting an output voltage VOUT. The output voltage VOUT may be higher than the input voltage VIN.

The transformer 210 includes a main coil 211 and a secondary coil 212. The main coil 211 is positioned on one side of the transformer 210, and the secondary coil 212 is positioned on the opposite side of the transformer 210. The main coil 211 has a first terminal coupled to the input node NIN, and a second terminal coupled to a first node N1. The secondary coil 212 has a first terminal coupled to a second node N2, and a second terminal coupled to a third node N3.

The detection circuit 220 includes a first capacitor C1, a second resistor R2, a third resistor R3, and a first diode D1. The second resistor R2 has a first terminal coupled to the second node N2, and a second terminal coupled to a fourth node N4 for outputting a detection voltage VE. The first capacitor C1 has a first terminal coupled to the fourth node N4, and a second terminal coupled to a ground voltage VSS. The first diode D1 has an anode coupled to the fourth node N4, and a cathode coupled to the third node N3. The third resistor R3 has a first terminal coupled to the third node N3, and a second terminal coupled to the ground voltage VSS.

The first resistor R1 has a first terminal coupled to the first node N1, and a second terminal coupled to a fifth node N5.

The power switch element 230 includes a transistor M1. The transistor M1 may be an NMOS transistor (N-type Metal Oxide Semiconductor Field Effect Transistor). The transistor M1 has a control terminal for receiving a clock voltage VA, a first terminal coupled to the ground voltage VSS, and a second terminal coupled to the fifth node N5. The clock voltage VA is arranged for adjusting the duty cycle of the power switch element 230. For example, when the boost converter 200 is initialized, the clock voltage VA may be maintained at a constant voltage. When the boost converter 200 is operating normally, the clock voltage VA can provide a periodical clock waveform. Specifically, if the clock voltage VA has a high logic level, the transistor M1 will be enabled, and conversely, if the clock voltage VA has a low logic level, the transistor M1 will be disabled.

The output stage circuit 240 includes a second diode D2 and a second capacitor C2. The second diode D2 has an anode coupled to the fifth node N5, and a cathode coupled to the output node NOUT. The second capacitor C2 has a first terminal coupled to the output node NOUT, and a second terminal coupled to the ground voltage VSS.

The feedback compensation circuit 250 includes a linear optical coupler 252, a voltage regulator 254, a third capacitor C3, a fourth capacitor C4, a fourth resistor R4, a fifth resistor R5, and a sixth resistor R6. The fourth resistor R4 has a first terminal coupled to the output node NOUT for receiving the output voltage VOUT, and a second terminal coupled to a sixth node N6. The third capacitor C3 has a first terminal coupled to a seventh node N7, and a second terminal coupled to an eighth node N8. The fifth resistor R5 has a first terminal coupled to the output node NOUT for receiving the output voltage VOUT, and a second terminal coupled to the eighth node N8. The sixth resistor R6 has a first terminal coupled to the eighth node N8, and a second terminal coupled to the ground voltage VSS. The fourth capacitor C4 has a first terminal coupled to a ninth node N9, and a second terminal coupled to the ground voltage VSS.

In some embodiments, the linear optical coupler 252 is implemented with a PC817 electronic component. The linear optical coupler 252 includes an LED (Light-Emitting Diode) DL and a BJT (Bipolar Junction Transistor) Q1. The LED DL has an anode coupled to the sixth node N6, and a cathode coupled to the seventh node N7. The BJT Q1 has a collector coupled to the ninth node N9 for outputting a feedback voltage VF, and an emitter coupled to the ground voltage VSS.

In some embodiments, the voltage regulator 254 is implemented with a TL431 electronic component. The voltage regulator 254 has an anode coupled to the ground voltage VSS, a cathode coupled to the seventh node N7, and a reference terminal coupled to the eighth node N8.

The controller 260 may be a PWM IC. The controller 260 includes a triangular-wave generator 262 and a comparator 264. The triangular-wave generator 262 generates an oscillation voltage VT, which may have triangular waveforms. The comparator 264 may be implemented with an operational amplifier. The comparator 264 has a positive input terminal coupled to the ninth node N9 for receiving the feedback voltage VF, a negative input terminal coupled to the triangular-wave generator 262 for receiving the oscillation voltage VT, and an output terminal for outputting the clock voltage VA. For example, if the feedback voltage VF is higher than or equal to the oscillation voltage VT, the clock voltage VA may have a high logic level, and conversely, if the feedback voltage VF is lower than the oscillation voltage VT, the clock voltage VA may have a low logic level.

The inverter 270 has an input terminal coupled to the triangular-wave generator 262 for receiving the oscillation voltage VT, and an output terminal for outputting an inverted oscillation voltage VN. In some embodiments, the conversion function of the inverter 270 is described as the following equation (1):

$$VN = -VT \tag{1}$$

where "VN" represents the inverted oscillation voltage VN, and "VT" represents the oscillation voltage VT.

The multiplier 280 has a first input terminal coupled to the fourth node N4 for receiving the detection voltage VE, a second input terminal coupled to the inverter 270 for receiving the inverted oscillation voltage VN, a third input terminal coupled to the ninth node N9 for receiving the feedback voltage VF, a first output terminal coupled to the first node N1, and a second output terminal coupled to the fifth node N5. Thus, a compensation voltage difference VD is formed between the first node N1 and the fifth node N5. The voltage difference between the first terminal and the second terminal of the first resistor R1 is equal to the aforementioned compensation voltage difference VD. In some embodiments, the conversion function of the multiplier 280 is described as the following equation (2):

$$VD = VE \cdot VN \cdot VF \tag{2}$$

where "VD" represent the compensation voltage difference VD, "VE" represents the detection voltage VE, "VN" represents the inverted oscillation voltage VN, and "VF" represents the feedback voltage VF.

Figure 3:
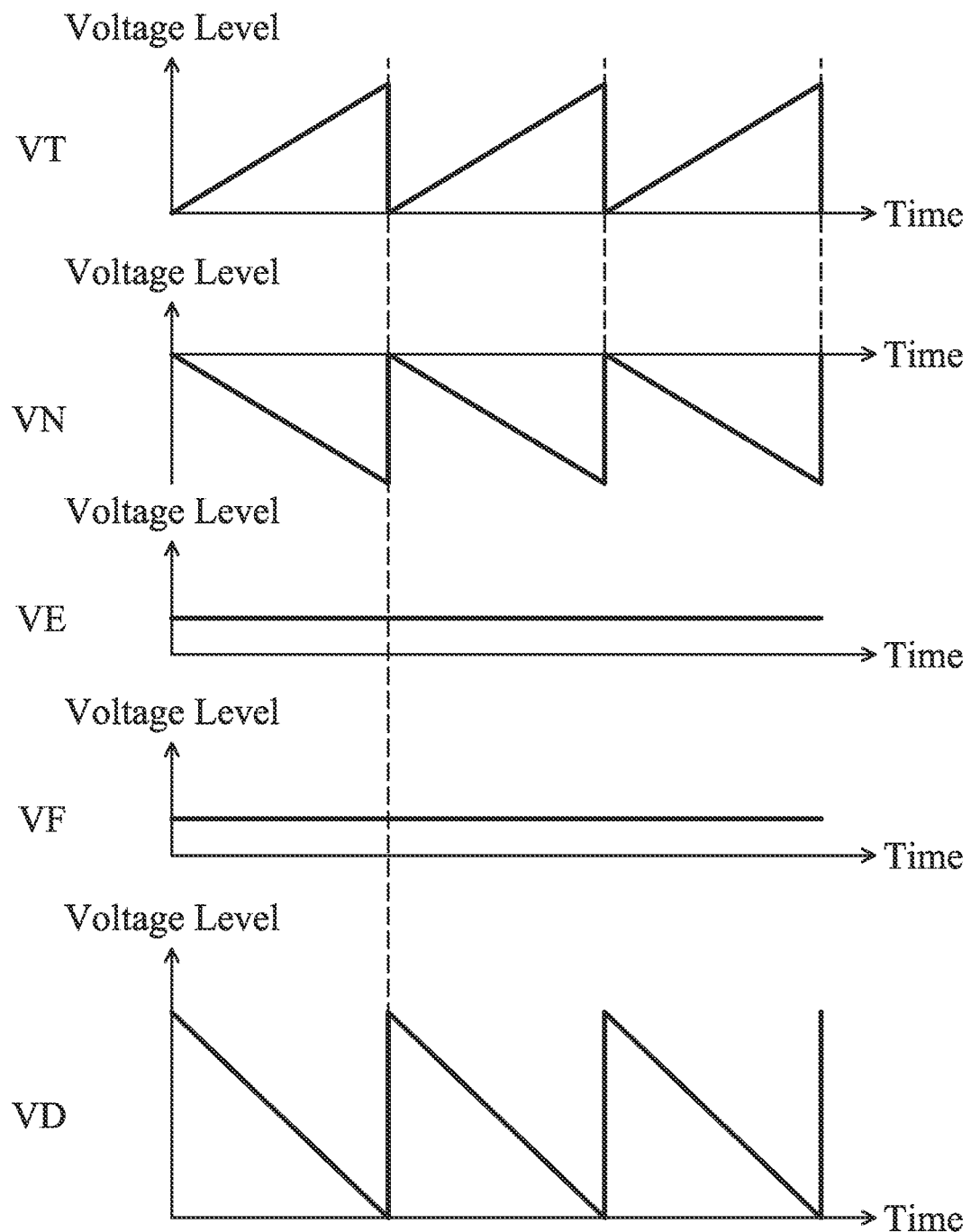
FIG. 3 is a diagram of signal waveforms of a boost converter according to an embodiment of the invention.

FIG. 3 is a diagram of signal waveforms of the boost converter 200 according to an embodiment of the invention. The horizontal axis represents time, and the vertical axis represents each voltage level. According to the measurement of FIG. 3, the operation theory of the boost converter 200 can be described as follows. The feedback compensation circuit 250 generates the feedback voltage VF according to the output voltage VOUT. The controller 260 compares the feedback voltage VF with the oscillation voltage VT, so as to modulate the duty cycle of the power switch element 230 and stabilize the output voltage VOUT. In addition, the compensation voltage difference VD of the multiplier 280 has a negative slope applied to the first resistor R1, so as to suppress the subharmonic oscillations which are generated when an inductive current IL flows through the main coil 211 and the first resistor R1 (in particular to the power switch element 230 with a duty cycle greater than 50%). It should be noted that the power switch element 230 is a core element of the boost converter 200. The invention designs the first resistor R1 in front of the power switch element 230. It not only effectively suppresses the subharmonic components of the currents flowing through the power switch element 230, but also further enhances the output stability of the boost converter 200.

Figure 4:
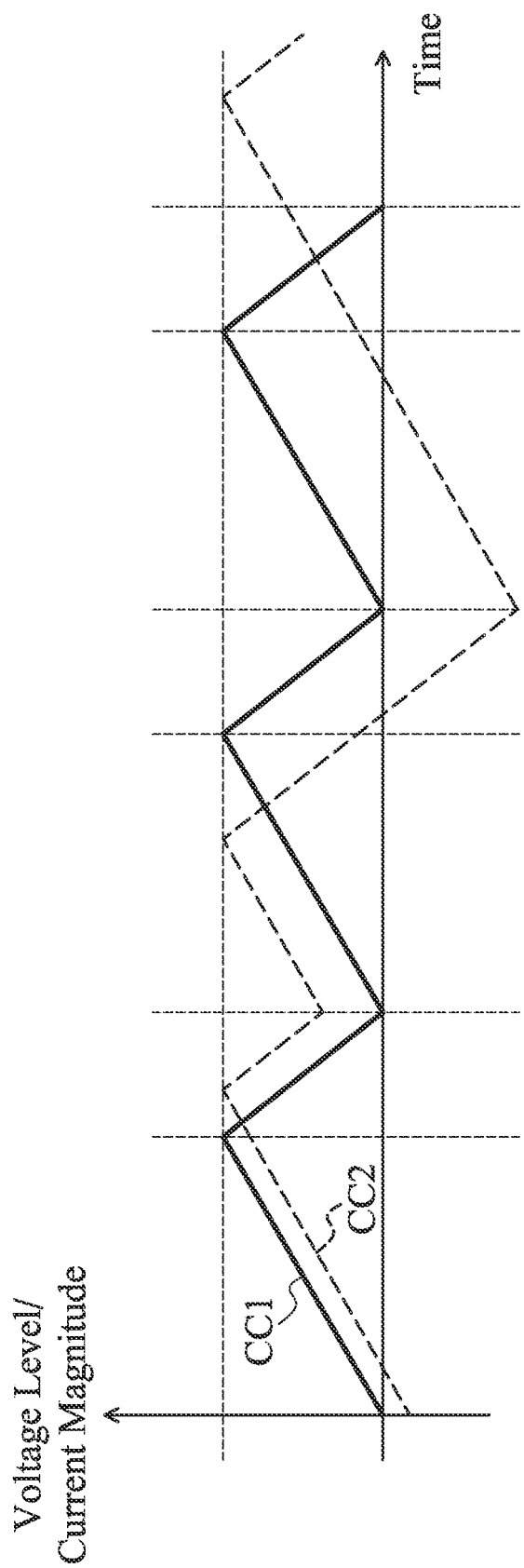
FIG. 4 is a diagram of signal waveforms of a conventional boost converter.

FIG. 4 is a diagram of signal waveforms of a conventional boost converter. The horizontal axis represents time, and the vertical axis represents a voltage level or current magnitude. As shown in FIG. 4, a first curve CC1 represents the waveform of the inductive current, and a second curve CC2 represents the waveform of the subharmonic voltage. According to the measurement of FIG. 4, when the duty cycle of the power switch element is greater than 50%, the unwanted subharmonic oscillations may diverge with time going by, and they may negatively affect the stability of the whole circuitry.

Figure 5:
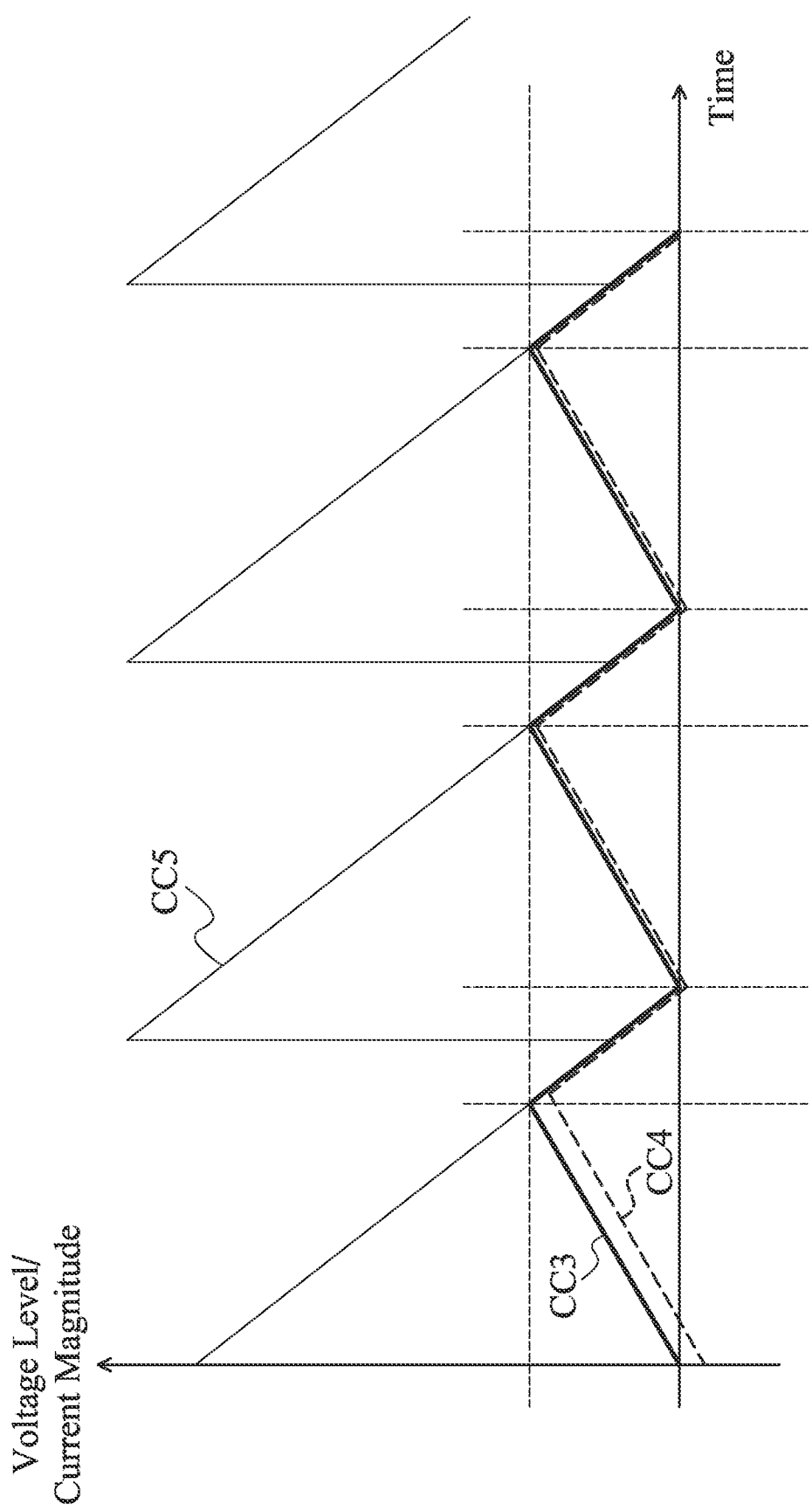
FIG. 5 is a diagram of signal waveforms of a boost converter according to an embodiment of the invention.

FIG. 5 is a diagram of signal waveforms of the boost converter 200 according to an embodiment of the invention. The horizontal axis represents time, and the vertical axis represents a voltage level or current magnitude. As shown in FIG. 5, a third curve CC3 represents the waveform of the inductive current IL, a fourth curve CC4 represents the waveform of the subharmonic voltage, and a fifth curve CC5 represents the waveform of the compensation voltage difference VD. According to the measurement of FIG. 5, even if the duty cycle of the power switch element 230 is greater than 50%, the compensation voltage difference VD of the multiplier 280 can be applied to the first resistor R1, and the unwanted subharmonic oscillations can converge with time going by. Thus, the proposed design of the invention can significantly improve the output stability of the boost converter 200.

In some embodiments, the element parameters of the boost converter 200 are described as follows. The capacitance of the first capacitor C1 may be from 42.3 µF to 51.7 µF, such as 47 µF. The capacitance of the second capacitor C2 may be from 612 µF to 748 µF, such as 680 µF. The capacitance of the third capacitor C3 may be from 1.49 nF to 1.51 nF, such as 1.5 nF. The capacitance of the fourth capacitor C4 may be from 0.99 nF to 1.01 nF, such as 1 nF. The magnetizing inductance of the main coil 211 may be from 540 µH to 660 µH, such as 600 µF. The auxiliary inductance of the secondary coil 212 may be from 45 µH to 55 µH, such as 50 µF. The resistance of the first resistor R1 may be from 0.95Ω to 1.05Ω, such as 1Ω. The resistance of the second resistor R2 may be from 9.5KΩ to 10.5KΩ, such as 10KΩ. The resistance of the third resistor R3 may be from 0.95KΩ to 1.05KΩ, such as 1KΩ. The resistance of the fourth resistor R4 may be from 42.75KΩ to 47.25KΩ, such as 45KΩ. The resistance of the fifth resistor R5 may be from 46.55KΩ to 51.45KΩ, such as 49KΩ. The resistance of the sixth resistor R6 may be from 0.95KΩ to 1.05KΩ, such as 1KΩ. The turn ratio of the main coil 211 to the secondary coil 212 may be from 1 to 100, such as 12. The above ranges of parameters are obtained and calculated based on the results of many experiments, and they help to minimize the subharmonic oscillations of the boost converter 200.

The invention proposes a novel boost converter which includes an inverter and a multiplier for suppressing subharmonic oscillations. According to practical measurements, the boost converter using the aforementioned design can significantly enhance output stability, and it is suitable for application in a variety of electronic devices.

Note that the above voltages, currents, resistances, inductances, capacitances and other element parameters are not limitations of the invention. A designer can adjust these parameters to meet different requirements. The boost converter of the invention is not limited to the configurations of FIGS. 1-5. The invention may merely include any one or more features of any one or more embodiments of FIGS. 1-5. In other words, not all of the features displayed in the figures should be implemented in the boost converter of the invention.

It will be apparent to those skilled in the art that various modifications and variations can be made in the invention. It is intended that the standard and examples be considered exemplary only, with a true scope of the disclosed embodiments being indicated by the following claims and their equivalents.

What is claimed is:

1. A boost converter for improving output stability, comprising:
    a transformer, comprising a main coil and a secondary coil, wherein the main coil receives an input voltage;
    a detection circuit, coupled to the secondary coil, wherein the detection circuit generates a detection voltage;
    a first resistor, coupled to the main coil;

a power switch element, selectively coupling the first resistor to a ground voltage according to a clock voltage;

an output stage circuit, coupled to the first resistor, wherein the output stage circuit generates an output voltage;

a feedback compensation circuit, comprising a linear optical coupler and a voltage regulator, wherein the feedback compensation circuit generates a feedback voltage according to the output voltage;

a controller, generating the clock voltage according to the feedback voltage and an oscillation voltage;

an inverter, generating an inverted oscillation voltage according to the oscillation voltage; and a multiplier, generating a compensation voltage difference according to the detection voltage, the inverted oscillation voltage, and the feedback voltage, wherein the compensation voltage difference is applied to the first resistor.

2. The boost converter as claimed in claim 1, wherein the main coil has a first terminal coupled to an input node for receiving the input voltage, and a second terminal coupled to a first node, and wherein the secondary coil has a first terminal coupled to a second node, and a second terminal coupled to a third node.

3. The boost converter as claimed in claim 2, wherein the detection circuit comprises:

a second resistor, wherein the second resistor has a first terminal coupled to the second node, and a second terminal coupled to a fourth node for outputting the detection voltage; and a first capacitor, wherein the first capacitor has a first terminal coupled to the fourth node, and a second terminal coupled to the ground voltage.

4. The boost converter as claimed in claim 3, wherein the detection circuit further comprises:

a first diode, wherein the first diode has an anode coupled to the fourth node, and a cathode coupled to the third node; and a third resistor, wherein the third resistor has a first terminal coupled to the third node, and a second terminal coupled to the ground voltage.

5. The boost converter as claimed in claim 4, wherein the first resistor has a first terminal coupled to the first node, and a second terminal coupled to a fifth node.

6. The boost converter as claimed in claim 5, wherein a voltage difference between the first node and the fifth node is equal to the compensation voltage difference.

7. The boost converter as claimed in claim 6, wherein the power switch element comprises:

a transistor, wherein the transistor has a control terminal for receiving the clock voltage, a first terminal coupled to the ground voltage, and a second terminal coupled to the fifth node.

8. The boost converter as claimed in claim 7, wherein the output stage circuit a second diode, wherein the second diode has an anode coupled to the fifth node, and a cathode coupled to an output node for outputting the output voltage; and a second capacitor, wherein the second capacitor has a first terminal coupled to the output node, and a second terminal coupled to the ground voltage.

9. The boost converter as claimed in claim 8, wherein the feedback compensation circuit further comprises:

a fourth resistor, wherein the fourth resistor has a first terminal coupled to the output node for receiving the output voltage, and a second terminal coupled to a sixth node;

a third capacitor, wherein the third capacitor has a first terminal coupled to a seventh node, and a second terminal coupled to an eighth node; and a fifth resistor, wherein the fifth resistor has a first terminal coupled to the output node, and a second terminal coupled to the eighth node.

10. The boost converter as claimed in claim 9, wherein the feedback compensation circuit further comprises:

a sixth resistor, wherein the sixth resistor has a first terminal coupled to the eighth node, and a second terminal coupled to the ground voltage; and a fourth capacitor, wherein the fourth capacitor has a first terminal coupled to a ninth node, and a second terminal coupled to the ground voltage.

11. The boost converter as claimed in claim 10, wherein the voltage regulator has an anode coupled to the ground voltage, a cathode coupled to the seventh node, and a reference terminal coupled to the eighth node.

12. The boost converter as claimed in claim 11, wherein the linear optical coupler includes an LED (Light-Emitting Diode) and a BJT (Bipolar Junction Transistor), wherein the LED has an anode coupled to the sixth node, and a cathode coupled to the seventh node, and wherein the BJT has a collector coupled to the ninth node for outputting the feedback voltage, and an emitter coupled the ground voltage.

13. The boost converter as claimed in claim 12, wherein the controller comprises:

a triangular-wave generator, generating the oscillation voltage; and a comparator, wherein the comparator has a positive input terminal coupled to the ninth node for receiving the feedback voltage, a negative input terminal for receiving the oscillation voltage, and an output terminal for outputting the clock voltage.

14. The boost converter as claimed in claim 13, wherein the inverter has an input terminal coupled to the triangular-wave generator for receiving the oscillation voltage, and an output terminal for outputting the inverted oscillation voltage.

15. The boost converter as claimed in claim 14, wherein the multiplier has a first input terminal coupled to the fourth node for receiving the detection voltage, a second input terminal for receiving the inverted oscillation voltage, a third input terminal coupled to the ninth node for receiving the feedback voltage, a first output terminal coupled to the first node, and a second output terminal coupled to the fifth node.

* * * * *